July 16, 1946.  D. A. WALLACE  2,404,329
COUPLING UNIT
Filed April 8, 1944  6 Sheets-Sheet 1

INVENTOR.
David A. Wallace.
BY Harness & Harris
ATTORNEYS.

July 16, 1946. D. A. WALLACE 2,404,329
COUPLING UNIT
Filed April 8, 1944 6 Sheets-Sheet 4
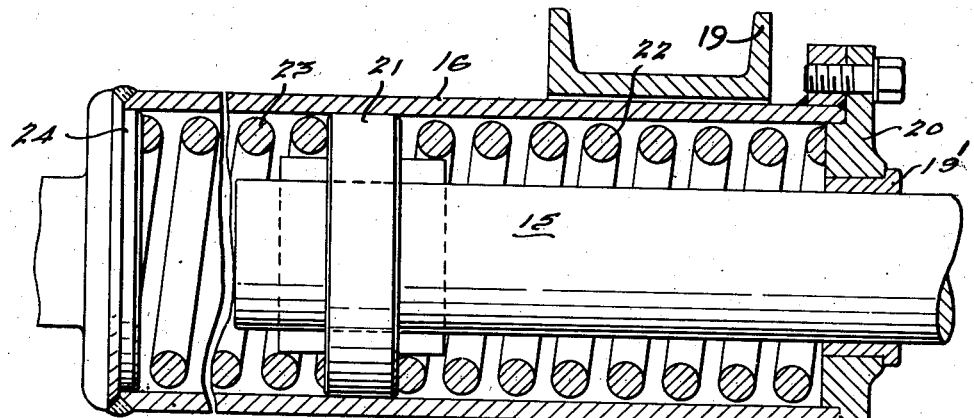
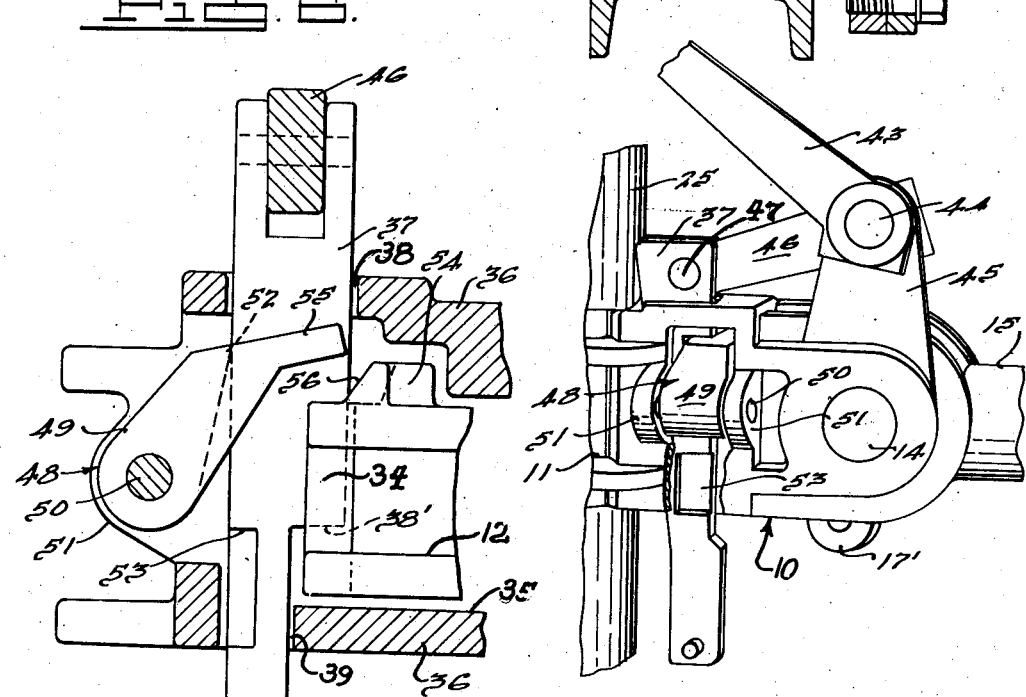
INVENTOR.
David A. Wallace.
BY Harness & Harris.
ATTORNEYS.

July 16, 1946.   D. A. WALLACE   2,404,329
COUPLING UNIT
Filed April 8, 1944   6 Sheets-Sheet 5
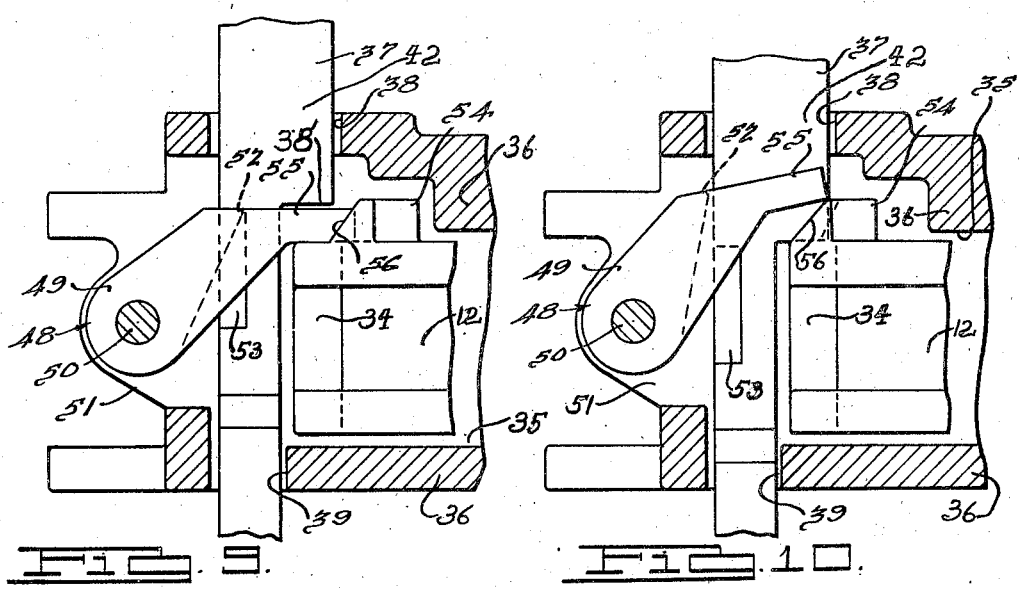
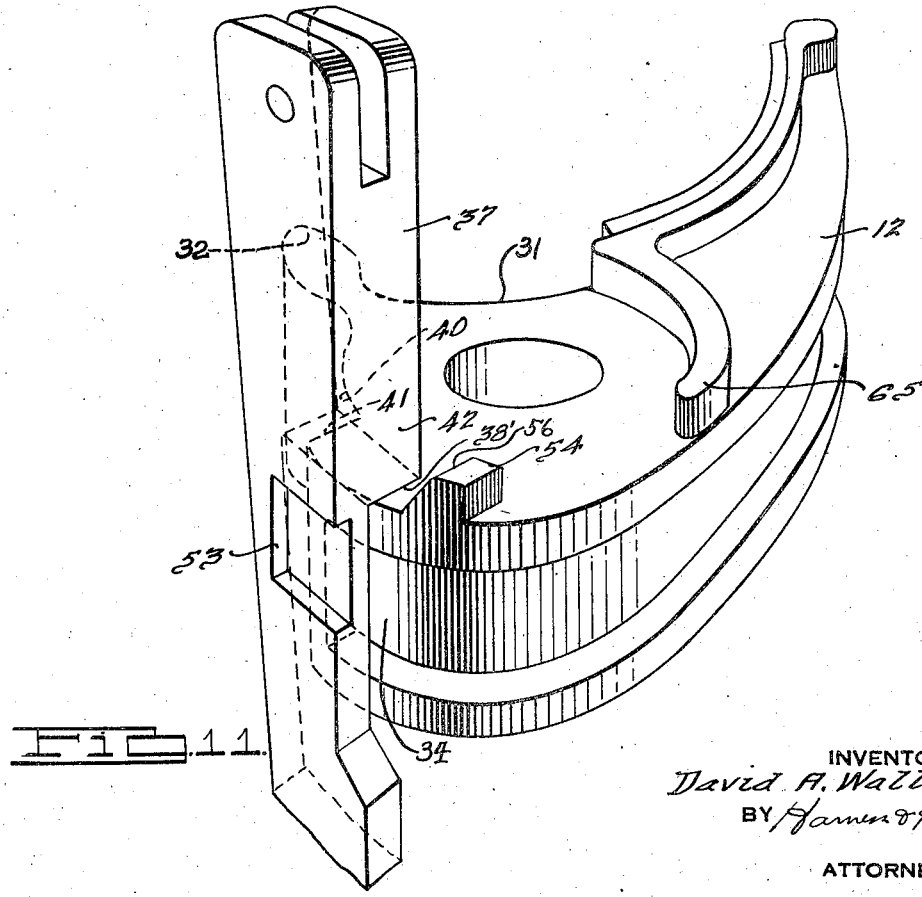
INVENTOR
David A. Wallace.
BY
ATTORNEYS.

July 16, 1946.   D. A. WALLACE   2,404,329
COUPLING UNIT
Filed April 8, 1944   6 Sheets-Sheet 6
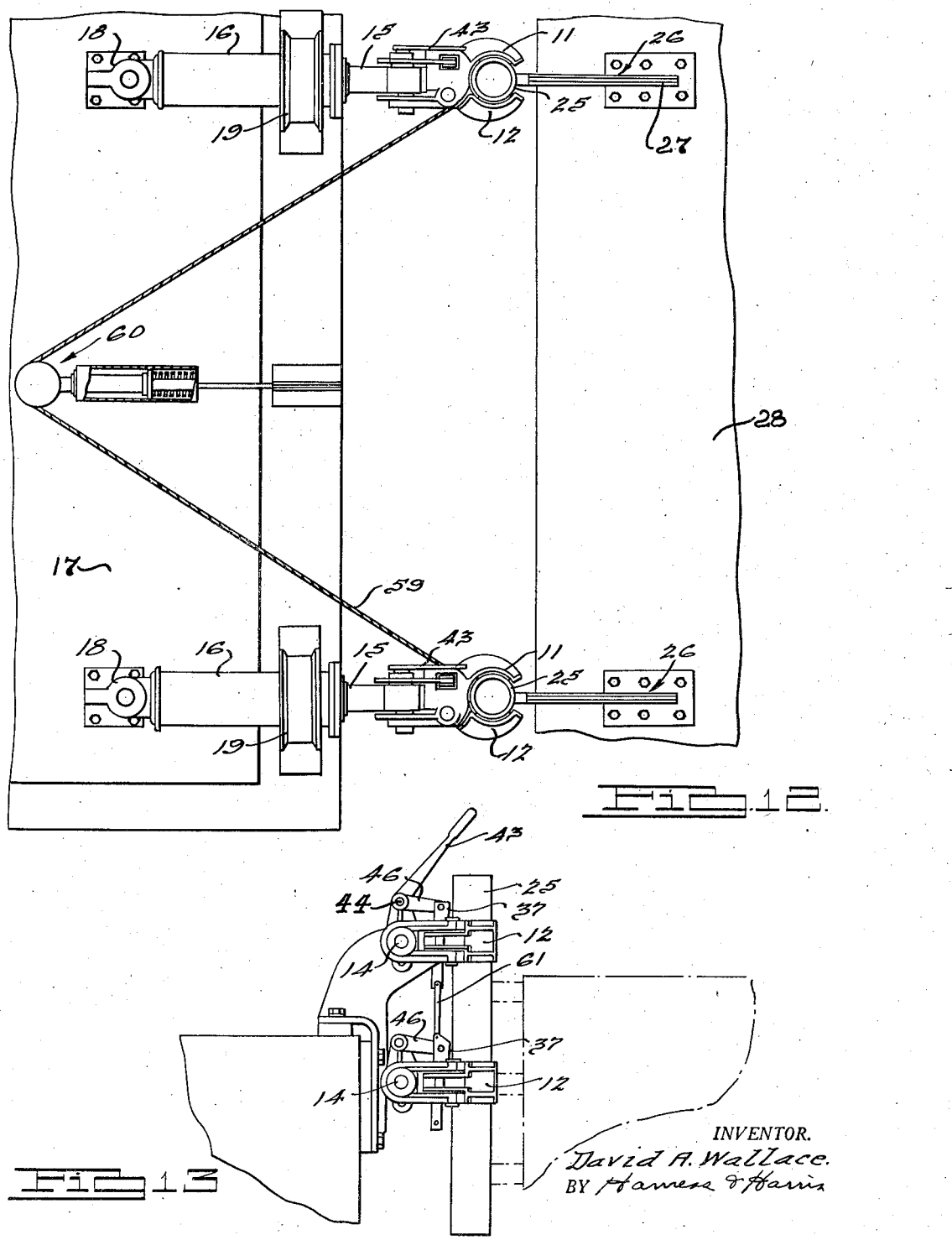

Patented July 16, 1946

2,404,329

UNITED STATES PATENT OFFICE 2,404,329

COUPLING UNIT

David A. Wallace, Detroit, Mich., assignor to Chrysler Corporation, Highland Park, Mich., a corporation of Delaware Application April 8, 1944, Serial No. 530,215

7 Claims. (Cl. 114—235)

This invention relates to an improved coupling apparatus.

More particularly, the invention pertains to improvements in coupling apparatus of the type which may be used in towing or pushing one vessel or vehicle by another.

One of the main objects of the invention is to provide an improved coupler in apparatus of this character which is adapted to receive and clampingly embrace a plain, cylindrical post-like fixture with a force which is increased by the tendency of coupler and post to vibrate or shift relative to each other.

Another object of the invention is to provide a coupler in apparatus of this kind which has a self-closing action when engaged by the post-like fixture it is adapted to receive and which may be manually conditioned to open in response to relative separatory movement of the coupler and post.

A further object of the invention is to provide relatively pivotally movable jaws in coupling apparatus of this kind which have a pivotal axis so offset laterally with respect to the central plane of the space between the jaws when the latter are closed, as to provide a relatively wide entrance for admission of the post when the jaws are in their open position.

Another object of the invention is to provide in a pivotally movable jaw of a coupler of this character an extension which projects into the space between the jaws at a location spaced substantially from the offset pivotal connection thereof for engaging the post as the latter is received between the jaws in order to move the pivotal jaw toward its closed position regardless of the angle of approach of the post and coupling.

An additional object of the invention is to provide in coupling apparatus of this kind a universally pivotal mounting for the coupler jaw unit which accommodates both rocking and pitching movements of one of a pair of coupled vehicles or vessels relative to the other and about angularly related axes respectively.

A still further object of the invention is to provide means in apparatus of this character for absorbing shock incident to both coupling and uncoupling operations, as well as that which occurs during towing or pushing operations.

Other objects of the invention are to provide a post-like fixture in coupling apparatus of this kind which may be embraced by the coupler jaws at relatively widely, vertically spaced locations corresponding to the draft of a vessel when empty and under full load, respectively; to provide a coupler unit which may be released, without uncoupling it from the post-like fixture, in order to adjust the coupler unit on the post for changes in the draft of one of the coupled vessels with respect to that of the other which result from variations in the respective loads carried thereby and to provide a coupler and coupling post fixture on a pair of vessels which are so located vertically with respect to each other and the respective vessels as to advantageously transmit either a pushing or towing force from one vessel to the other while the post and coupling unit are connected at any one of a relatively wide range of vertically spaced positions.

Additional objects of the invention are to provide coupling apparatus which may be applied singly or in tandem between a pair of vehicles or vessels one of which is to be towed or pushed by the other and to provide couplers which may be readily released and reset to accommodate an angular disposition of one vehicle or vessel relative to the other for facilitating maneuvering during parking and docking.

Still further objects of the invention are to provide a locking bar in a coupling of this kind which, when in one position, serves to positively lock the jaws thereof against opening and which, when in a different position, serves to yieldably oppose unintended closing of such jaws from an open position; to provide coupling units of this character which are adapted to be arranged in vertically aligned pairs for coacting with the same post of an associated fixture; and to provide interconnected jaw-locking mechanism in an assembly of coupling units of this kind by which the clamping jaws of the respective units can be simultaneously locked and unlocked.

Illustrative embodiments of the invention are shown in the accompanying drawings, in which:

Fig. 6 is a fragmentary, vertical, sectional view taken on line 6—6 of Fig. 4.

Fig. 7 is a fragmentary, vertical, sectional view taken on line 7—7 of Fig. 3, illustrating the relative positions of the locking bar and associated parts of the coupling when the jaw elements thereof are positively locked in closed position.

Fig. 8 is a fragmentary perspective view of the coupling shown in Fig. 1.

Fig. 9 is a view similar to Fig. 7 but showing the locking bar in position to accommodate initial opening of the jaws of the coupling.

Fig. 10 is a view similar to Figs. 7 and 9 but showing the locking bar in position to yieldably oppose unintended closing of the jaws from their open position.

Fig. 11 is a fragmentary perspective view of the locking bar and the jaw element of the coupling with which it cooperates.

Fig. 12 is a fragmentary plan view illustrating the manner in which two vessels may be coupled together by a pair of laterally spaced coupling members embodying the invention.

Fig. 13 is a fragmentary elevational view illustrating the manner in which two vessels may be coupled together by a pair of vertically aligned coupling members embodying the invention.

Figure 1:
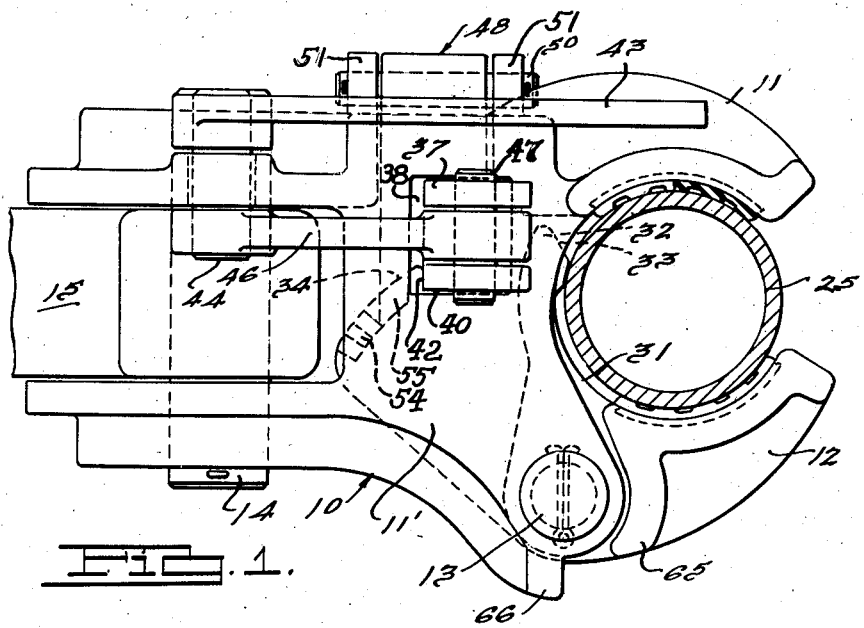
Fig. 1 is a plan view of a coupling apparatus embodying the invention and showing the jaws thereof in closed position.
Figure 2:
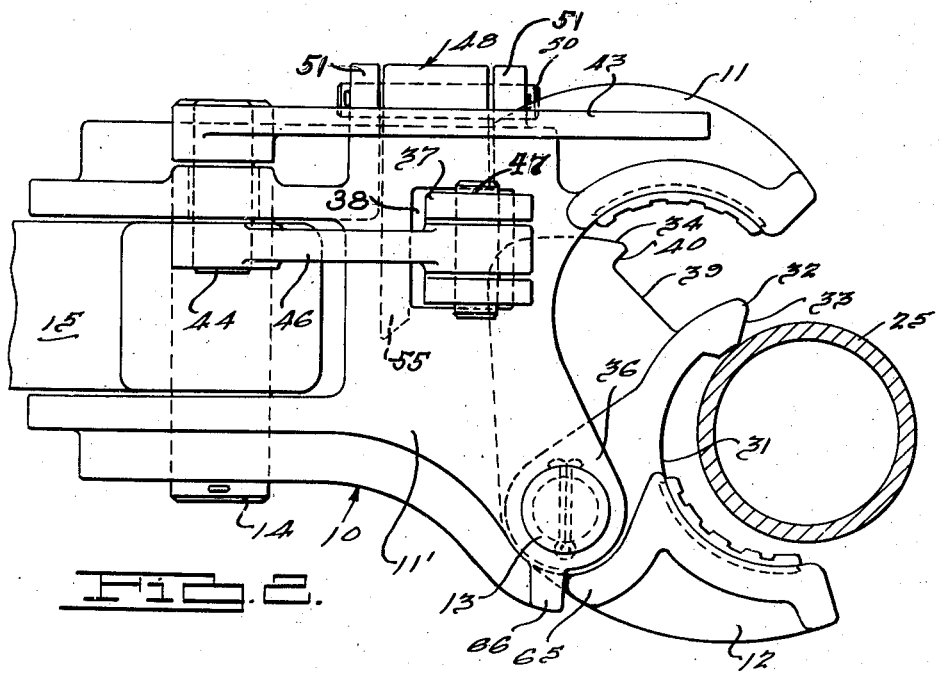
Fig. 2 is a view similar to Fig. 1 but showing the jaws of the coupling unit in open position.
Figure 3:
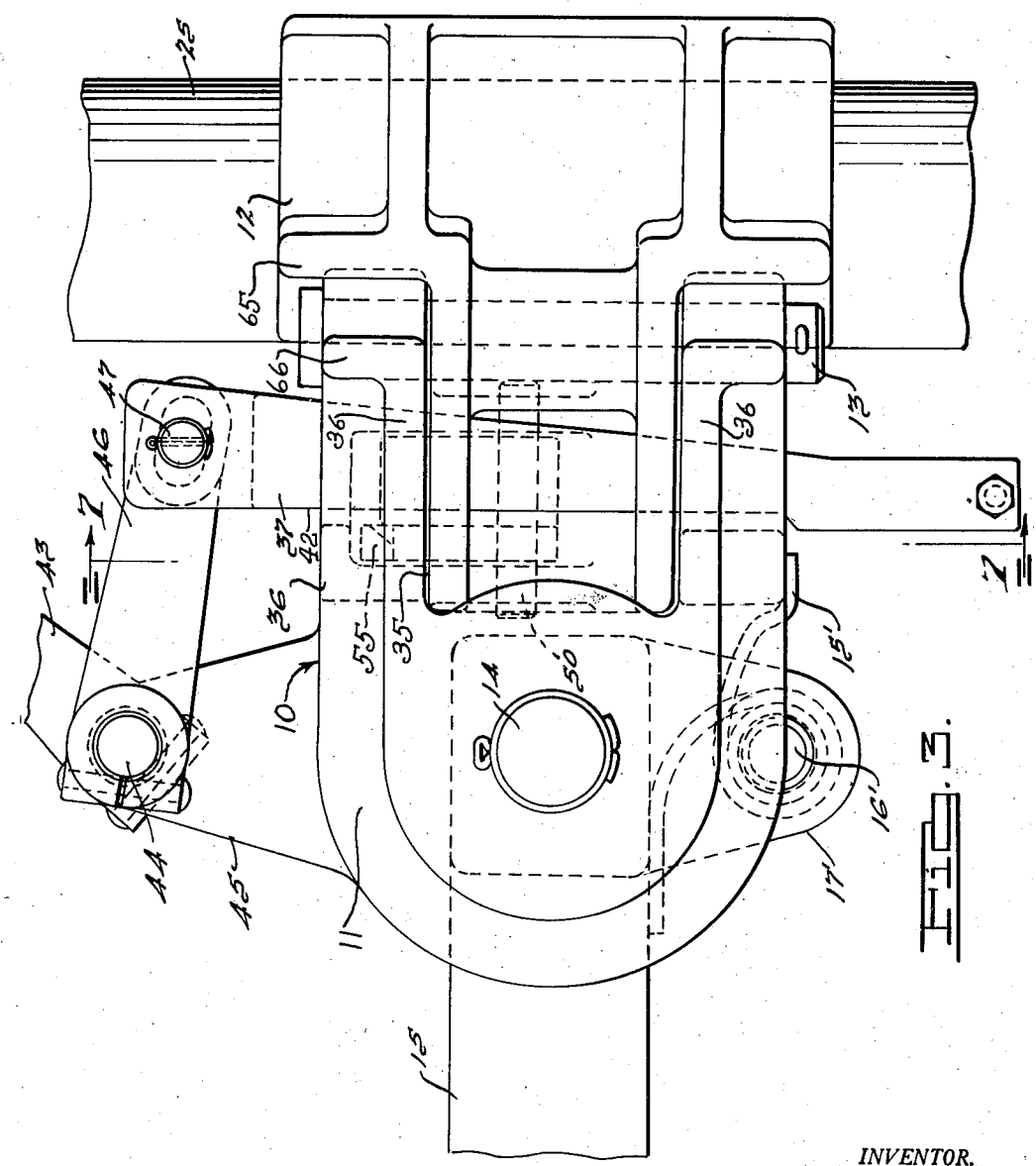
Fig. 3 is a fragmentary side elevational view of the coupling apparatus shown in Fig. 1.

In the drawings is illustrated an adaptation of the improved coupling apparatus for coupling together of a pair of vessels, one of which serves to impart propelling force to the other. The coupling comprises a head portion, generally designated by the numeral 10, which includes a stationary body 11' having a jaw 11 and a relatively pivotally movable jaw 12 which is pivotally attached thereto by a pin 13. The head portion 10 is pivotally mounted at 14 on the outer end of a bar 15 which is shiftably mounted in a cylindrical casing 16. The casing 16 is adapted to be attached to the deck 17 of a tug, barge, or other vessel by mounting brackets 18 and 19. The bar 15 extends centrally of the casing 16 and is slidably supported at the rear end of the casing by a bearing 19' mounted in an aperture formed in an end wall 20 of the casing 16. Fixed on the inner end of the bar 15 is a collar 21 having a periphery which slidably engages the inner surface of the casing 16, thus supporting the inner end of the bar. A coil spring 22 is biased between one side of the collar 21 and the rear end wall 20 of the casing and a similar coil spring 23 is biased between the opposite side of the collar 21 and the front end wall 24 of the casing. The springs 22 and 23 serve to yieldably oppose shifting of the bar 15 and the coupler head 10 carried thereby in respectively opposite directions. These springs may, as shown in Fig. 6, vary in length so as to accommodate different amounts of shifting movement of the bars 15 in respectively opposite directions and they may also vary in rate or stiffness to meet required thrusts in such respective directions. The bar 15 is so supported by the foregoing structure as to accommodate oscillative movement of the bar about its longitudinal axis as well as shifting thereof in the direction of this axis. Inasmuch as the rotative axis of the bar 15 is, as shown in Figs. 1 and 2, substantially normal to the pivotal axis of the head 10 which is provided by the pin 14, the head portion 10 is thus free to pivot universally in all directions as well as to shift bodily against the actions of the springs 22 and 23. A spring 15' having an intermediate portion coiled about a pin 16' carried by an extension 17' projecting downwardly from the bar 15, has its opposite ends biased between the bar 15 and the head portion 10 so as to normally yieldably retain the latter in longitudinal alignment with the bar 15.

The jaws 11 and 12 are adapted to clampingly embrace a purchase provided on a vessel or vehicle such as a post 25 of a fixture, generally designated at 26. The fixture 26 includes an upper bracket 27 which is adapted to be attached to the deck 28 of a vessel and a lower bracket 29 which is preferably securable to an end wall of the vessel. When applied to a barge, for example, the bracket 29 may be attached to that portion of the hull which is normally inclined with respect to the forward vertical wall 30 of the barge. The post 25 is preferably held in spaced relation from the bow of the barge in order to accommodate free access of the jaws to the post as well as relative movement of the jaws and post. The post 25 also preferably extends a substantial distance above and below the level of the deck 28 so as to facilitate attachment of the coupling to the post at various elevations as required by variations of the drafts of the vessels.

The axis for the pivotally mounted jaw 12 provided by the pin 13 is laterally offset with respect to the central plane of the space between the jaws when the latter are closed so as to provide a relatively wide entrance for admission of the post 25 when the jaws are in open position. The pivoted jaw 12 has a substantially semi-cylindrical seat 31 which is formed in part by an extension 32 that projects into the space between the jaws when the latter are open. The extension 32 has an inclined face 33 which is adapted to abut the post as the latter moves into the entrance between the jaws. Engagement of the post 25 with the extension 32 promotes rotation of the pivotal jaw 12 towards its closed position as the post 25 and coupling head portion 10 approach each other during coupling operation. With this construction, approaching movement of the post and coupling head portion throughout a wide range of angles of approach results in automatic closing of the jaws of the coupling and ultimate disposition of the post 25 in the semi-cylindrical seat 31.

The pivotal jaw member 12 has an outwardly protruding segment 34 which is disposed about the axis of the pin 13 in a counter-clockwise direction, as viewed in Fig. 2, from the extension 32. The segment 34 is receivable in a channel 35 disposed between upper and lower wall portions 36 provided on the stationary jaw member 11 which serve to support the pin 13. A substantially vertically disposed locking bar 37 is shiftably mounted in registering passages 38 and 39 formed in the upper and lower wall portions 36, respectively, of the stationary jaw member. As illustrated in Figs. 7 to 11, the locking bar 37 is adapted to cooperate with the pivotal jaw member 12 in yieldably holding it in an open position and in positively locking it in a closed position. The lower end section of the locking bar 37 is of less thickness than the upper end section thereof and there is provided at the junction of these two sections a shoulder 38' which, as shown in Figs. 10 and 11, is adapted to rest upon the upper surface of the segment 34 in order to yieldably hold the pivoted jaw 12 against unintended displacement from an open position by vibration and other actions to which it is subjected.

The segment 34 is provided with a notch 40 for receiving a portion of the upper section of the locking bar 37 when the pivotal jaw 12 is in closed position. The notch 40 has a shoulder 41 at one end which is engageable with the side surface 42 of the bar 37 for positively locking the jaw 12 against opening movement when the locking bar is in its lower position, as viewed in Fig. 7. As illustrated in Figs. 8 and 11, the upper end section of the locking bar is tapered in width from a maximum width at its upper end so as to wedgingly engage between the shoulder 41 and a wall of each of the passages 38 and 39 through which the bar extends, thus tending to urge the jaw 12 toward a further closed position. This taper of the upper end of the locking bar also accommodates closing the jaws into gripping relationship with respect to fixtures or posts of different cross-sectional dimensions.

A yieldable lining material comprising, rubber, sponge rubber, leather or the like is fixed to the concaved side faces of the jaws 11 and 12 which engage the post 25 for coacting frictionally therewith. This yieldable lining material and the wedging action of the locking bar 37 promotes working of the jaws into increasingly tighter gripping relation with respect to the post 25 as a result of relative turning of the coupling and post about the axis of the latter due to vibration and relative movements of the vessels or vehicles connected thereby.

The locking bar 37 is normally urged downwardly by its own weight and by the gravity action of a control lever 43 which is pivoted at 44 to a bracket 45 extending upwardly from the head portion 10 of the coupling. The lever 43 has an arm 46 pivotally connected at 47 to the upper end of the locking bar. Pivotal movement of the lever 43 in a counter-clockwise direction about the pivot 44, as viewed in Fig. 5, lifts the bar from the position shown in Fig. 7 to the position shown in Fig. 9. Latch mechanism, generally designated by the numeral 48, is provided in order that the lever 43 may be released after the locking bar 37 is raised to its upper position without permitting the latter to return to its lower position. This mechanism includes a latch member 49 pivoted on a pin 50 mounted in ears 51 which protrude from the body portion 10 of the coupling. The latch member 49 has a pointed edge portion 52 which is adapted to engage in a notch 53 formed in the side of the locking bar 37 opposite from the segment 34. The latch member 49 is biased by its weight in a clockwise direction about the axis of the pin 50 and readily engages in the notch 53 when the latter is raised into registration with it.

When the lock bar 37 is thus held in its upper position, the pivoted jaw member is free to be opened manually or in response to separatory movement of the coupling member and post. During opening movement of the pivoted jaw member 12 a lug 54 which projects upwardly from the segment 34, at a location spaced from the shoulder 41, engages a finger 55 on the latch member 49. The lug 54 has an inclined side 56 which cams the latch member 49 in a counter-clockwise direction about its pivotal axis, as illustrated in Fig. 10, until the edge 52 thereof becomes disengaged from the notch 53. The locking bar 37 is then permitted to descend until the shoulder 38' of the locking bar rests upon the upper surface portion of the segment 34 which is located between the lug 54 and the end wall 41 of the notch 40. The weight of the locking bar thus applied on the segment 34 yieldably opposes unintended closing of the jaw 12. Opening of the jaw 12 is limited by engagement of an upstanding flange 65 on the jaw 12 with a stop 66 protruding from the ear 36, as shown in Fig. 2. When the jaw is subsequently closed, as heretofore set forth, the accompanying rotation of the segment brings the notch 40 into registration with the bar 37 which drops into the notch 40, thus positively locking the jaw 12 against opening.

Figure 4:
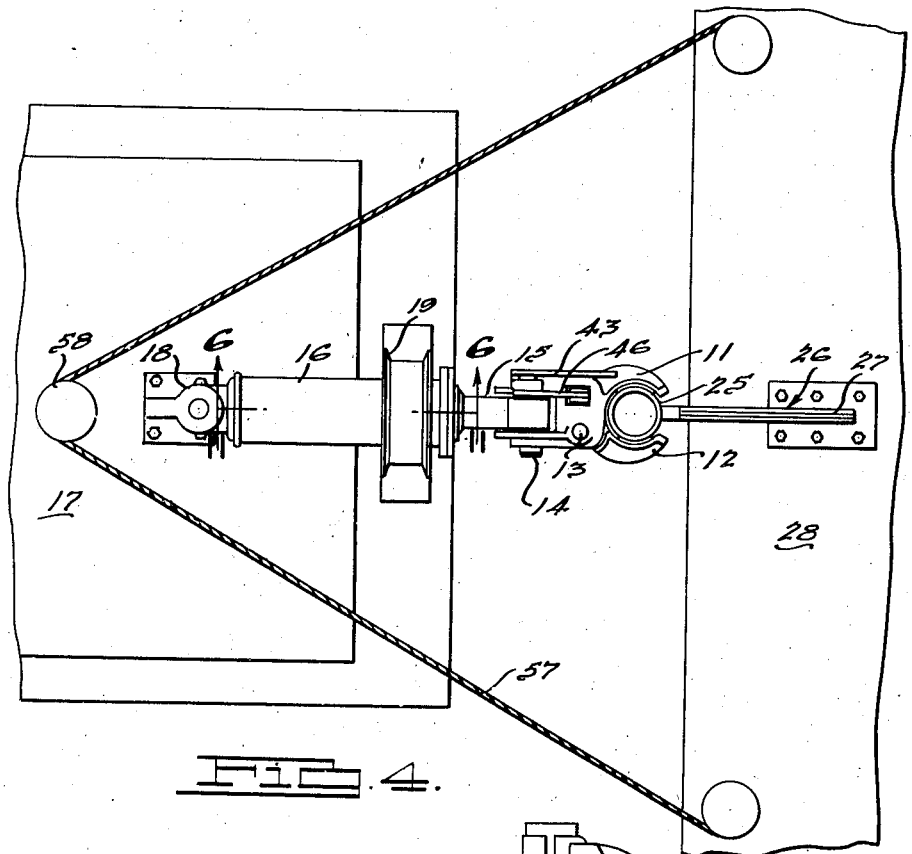
Fig. 4 is a fragmentary plan view showing coupling apparatus embodying the invention applied to a propelling and propelled device such as a tug and barge or vehicle and trailer.
Figure 5:
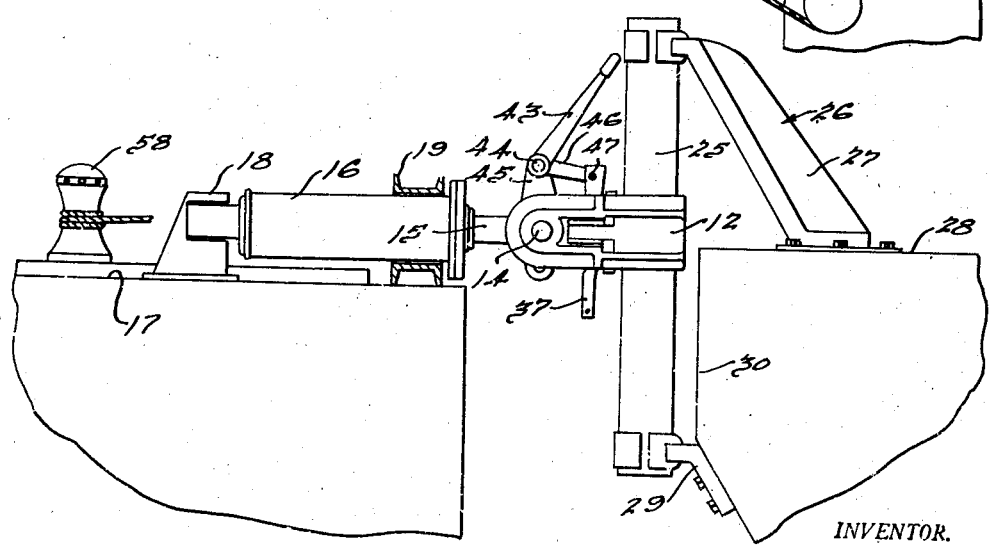
Fig. 5 is a side elevational view of the assembly shown in Fig. 4.

Two vessels may be coupled together, as illustrated in Figs. 4 and 5, by a single coupling embodying the invention. The coupling unit and post are preferably located in the longitudinal central plane of the vessels which may be releasably held against unintended displacement from longitudinal alignment by a cable 57 having its opposite ends fixed to one vessel at laterally spaced locations and having its intermediate part coiled about a capstan 58. The vessels may be fixed in angular relation by releasing the coupling and turning the drum of the capstan to selectively predetermine the lengths of the sections of cable leading from the capstan.

A pair of vessels may be coupled together, as illustrated in Fig. 12, with the aid of two laterally spaced couplings. In this use of coupling apparatus embodying the invention, a cable 59 may be fixed at its opposite end, as shown in Figs. 4 and 5, to laterally spaced locations on one vessel and looped over a spring pressed pulley, generally designated by the numeral 60, mounted on the other vessel. The cable is thus tensioned and serves to prevent complete separation of the vessels during maneuvering. The vessels may be connected by only either one of the coupling units when it is desired to dispose them in angular relation for purposes of docking and maneuvering.

In Fig. 13, is illustrated the employment of vertically aligned couplings of the character shown in Figs. 1 to 12 for connection with the same post. The locking bars 37 of each of the couplings shown in Fig. 13 are connected together by a link 61 so as to be simultaneously operated by manipulation of the lever 43 of the upper coupling, the corresponding control lever of the lower coupling being omitted.

The improved coupling apparatus is pivotally as well as shiftably flexible and especially well suited for withstanding shock, vibration, thrust and all of the various forces to which a device of this kind is subjected by towing as well as wave actions. The jaws may be preset in widely spaced open relationship to facilitate entry of a post or other purchase portion of a fixture therebetween. Closing of the jaws is entirely automatically produced by movement of the post into position to be gripped by the jaws. The wedging action of the locking bar assures firm gripping of the post by the jaws and the yieldable frictional lining of the jaws assists in the attainment of an increased gripping action. The locking bar can be preset in its released position to facilitate uncoupling of the unit in response to relative separatory movement of the vessels. Full opening of the jaws brings the locking bar into position to yieldably oppose unintended closing of the jaws and into readiness for its next locking action.

Coupling apparatus embodying the invention may be employed to releasably couple together vehicles and other objects, as well as vessels.

Although but several specific embodiments of the invention are herein shown and described, it will be understood that various changes in the sequence of operations, steps and materials employed may be made without departing from the spirit of the invention.

I claim:

1. Apparatus for coupling one body to another body having a member thereon providing a purchase comprising a clamping member including a pair of relatively movable jaws having clamping ends between which said purchase is receivable, a yieldable lining material on at least one of the internal surfaces of said jaws having an extensive surface area for frictionally contacting with said purchase, one of said jaws having a passageway therein and the other having an abutment registerable with said passageway, and means for releasably locking said jaws in closed embracing relationship with respect to said purchase comprising a wedge member shiftably mounted in said recess and having opposite diverging sides directly engageable, respectively, with said abutment and a wall of said passageway, said wedge member being adapted to shift in response to relative movement of said jaws when the latter are in closed position for increasing the gripping action thereof upon said purchase and for retaining said yieldable material under compression between said jaws and said purchase.

2. A coupling comprising relatively movable jaw elements each having a clamping end portion adapted to embrace an object, sheet-like yieldable lining material on the internal surfaces of said clamping end portions having a substantially extensive surface area adapted to frictionally engage said object, and a releasable locking bar shiftably mounted on said coupling having a tapered portion adapted to cooperate with opposed surfaces on each of said jaw elements for opposing opening movement thereof from a closed position, said locking bar being shiftable during vibratory movement of said jaw elements relative to each other when closed for opposing opening thereof from progressively more closed positions and for progressively increasing compression of said yieldable material between said object and said clamping end portions.

3. A coupling comprising relatively movable jaw elements having clamping end portions formed to embracingly partially surround an object and having opposite overlapping end portions, sheet-like yieldable frictional lining material on the internal sides of said clamping end portions, having a substantially extensive frictional surface area, a pivot connecting said jaw elements at a location intermediate said end portions, one of said overlapping end portions having a slot therein located on the side of said pivot opposite from its clamping end portion, and the other of said superimposed end portions having a shoulder registerable with said slot, and a locking bar shiftably mounted in said slot having a wedge-shaped portion engageable with said shoulder and an end of said slot for progressively wedging said overlapping end portions apart and said clamping end portions together into firm gripping engagement with said object during slight relative movements of said jaw elements.

4. A coupling comprising relatively movable jaw elements having clamping end portions formed to embracingly partially surround an object and having opposite overlapping end portions, yieldable frictional lining material on the internal sides of said clamping end portions, a pivot connecting said jaw elements at a location intermediate said end portions, one of said overlapping end portions having a slot therein located on the side of said pivot opposite from its clamping end portion, and the other of said superimposed end portions having a shoulder registerable with said slot, a locking bar shiftably mounted in said slot having a wedge-shaped portion engageable with said shoulder and an end of said slot for progressively wedging said overlapping end portions apart and said clamping end portions together into firm gripping engagement with said object during slight relative movements of said jaw elements, said locking bar having a reduced end portion adapted when aligned with said shoulder to accommodate opening of said jaw elements, means for shifting said locking bar to bring said reduced end portion thereof into alignment with said shoulder, a latch element for releasably holding said locking bar in said last mentioned position, and means on one of said jaw elements engageable with said latch element for releasing the same to accommodate movement of said wedge portion into registration with said shoulder during initial relative closing movement of said jaw elements.

5. Coupling apparatus comprising a support, a pair of clamping units mounted on said support in spaced relationship, each including a pair of relatively movable jaw elements having clamping end portions formed to embracingly partially surround an object and having opposite overlapping end portions, a pivot connecting said jaw elements at a location intermediate said end portions, one of said jaw elements of each unit having a slot therein located on the side of said pivot opposite from its clamping end portion and the other having a shoulder registerable with said slot when said jaw elements are in closed position, mechanism for releasably locking each of said clamping units in closed position comprising a locking bar shiftably mounted in each of said slots having an abutment engageable with the associated shoulder respectively and a member interconnecting said locking bars, and an operating member connected with one of said locking bars and adapted to shift both of said locking bars for bringing said abutments out of alignment with said shoulders in order to simultaneously accommodate opening of both of said clamping units.

6. Coupling apparatus comprising a support, a pair of clamping units mounted on said support in vertically spaced relationship, each including a pair of relatively movable jaw elements, a member shiftably mounted on each of said units for releasably locking the clamping jaw elements thereof in closed position, means for interconnecting said members, and an operating lever connected with one of said members for simultaneously shifting said members to their jaw element releasing positions.

7. A coupling comprising relatively movable jaw elements having clamping end portions formed to embracingly partially surround an object and having opposite overlapping end portions, a pivot connecting said jaw elements at a location intermediate said end portions, one of said overlapping end portions having a slot therein located on the side of said pivot opposite from its clamping end portion, and the other of said superimposed end portions having a shoulder registerable with said slot, a locking bar shiftably mounted in said slot having a wedge-shaped portion engageable with said shoulder and an end of said slot for progressively wedging said overlapping end portions apart and said clamping end portions together into firm gripping engagement with said object during slight relative movements of said jaw elements, said locking bar having a reduced end portion adapted when aligned with said shoulder to accommodate opening of said jaw elements, means for shifting said locking bar to bring said reduced end portion thereof into alignment with said shoulder, a latch element for releasably holding said locking bar in said last mentioned position, and means on one of said jaw elements engageable with said latch element for releasing the same to accommodate movement of said wedge portion into registration with said shoulder during initial relative closing movement of said jaw elements.

DAVID A. WALLACE.